United States Patent [19]

Carter et al.

[11] 4,003,533
[45] Jan. 18, 1977

[54] COMBINATION AIRBRAKE AND PITCH CONTROL DEVICE

[75] Inventors: Glenn T. Carter; Thomas F. Paniszczyn, both of Fort Worth, Tex.

[73] Assignee: General Dynamics Corporation, Fort Worth, Tex.

[22] Filed: Feb. 5, 1976

[21] Appl. No.: 655,585

Related U.S. Application Data

[60] Division of Ser. No. 402,540, Oct. 1, 1973, Pat. No. 3,942,746, which is a continuation-in-part of Ser. No. 212,180, Dec. 27, 1971, abandoned.

[52] U.S. Cl. .................. 244/42 D; 244/110 D; 244/113
[51] Int. Cl.² .................................. B64C 9/32
[58] Field of Search ............. 244/13, 36, 46, 42 D, 244/42 DA, 42 DC, 110 D, 90 A, 113, 43, 124, 120

[56] References Cited
UNITED STATES PATENTS

| | | | |
|---|---|---|---|
| 1,974,407 | 9/1934 | Barnhart | 244/42 DC |
| 2,263,992 | 11/1941 | Joyce | 244/42 D |
| 2,317,267 | 4/1943 | Gazda | 244/43 |
| 2,344,945 | 3/1944 | Knox et al. | 244/42 DC |
| 2,480,040 | 8/1949 | Mitchell | 244/113 |
| 2,723,091 | 11/1955 | Davies et al. | 244/42 D |
| 3,870,253 | 3/1975 | Leidy et al. | 244/46 |

FOREIGN PATENTS OR APPLICATIONS 1,581,069  2/1970  Germany .................. 244/90 A

OTHER PUBLICATIONS

Janet's All The World's Aircraft, 1971–1972, pp. 84, 86 and 315–316, "Grumman Tomcat."

Primary Examiner—Stephen G. Kunin
Assistant Examiner—Galen L. Barefoot
Attorney, Agent, or Firm—Charles E. Schurman; Charles C. M. Woodward

[57] ABSTRACT

An aircraft having a composite configuration comprising a conventional fuselage forebody portion which symmetrically and variformly blends into a relatively wide, substantially flat beaver-tail-like afterbody, with said afterbody having an integral pitch trimming camber and a composite pitch control device and air brake, hinged transversely thereacross and forming at least a part of its trailing edge. A pair of upper and lower airbrake panels are fitted flat-like against the upper and lower surfaces of the pitch control device. The airbrake panels are provided with control linkage which permits the panels to move parallel to the surfaces and be angularly displace relative thereto.

2 Claims, 12 Drawing Figures

COMBINATION AIRBRAKE AND PITCH CONTROL DEVICE

CROSS REFERENCE TO RELATED APPLICATIONS

This is a division of pending application Ser. No. 402,540 filed Oct. 1, 1973, now U.S. Pat. No. 3,942,746 which is a continuation-in-part of our co-pending application Ser. No. 212,180, filed Dec. 27, 1971, now abandoned.

BACKGROUND OF THE INVENTION

This invention relates to improvements in aircraft design configuration and related operational functions primarily in the supersonic flight regimes (Mach I and above).

Until the present, conventional, tapering, conical boattail shapes generally formed the afterbody of aircraft. A typical afterbody of the known art is illustrated in U.S. Pat. No. 3,447,761 and also in U.S. Pat. No. 3,076,625. Several disadvantages are inherent in the conventional conical boattail shapes, especially when the engines are buried, or housed within the fuselage afterbody, forming bulky, aerodynamically inefficient, postern profiles and particularly between engines in multi-engine aircraft. The aerodynamic problems associated with the postern profile of conventional aircraft are especially deleterious and complex in the supersonic speed regimes. The problem is even more severe if the nozzles of the buried engines emerge from the fuselage. At supersonic speeds flow separation occurring from the aft fuselage surface contours and the highly converging surfaces between the emerging engine nozzles increases the postern of wake drag of the aircraft and is significantly detrimental to its performance. This base drag, induced by the conical boatstern-like aft end of a conventional fuselage, is very detrimental to the performance of aircraft, particularly during supersonic flight.

High fineness ratio which is derived by dividing the length of the fuselage by its maximum equivalent diameter presently necessitates use of exceptionally long fuselages which are required in order to reduce the conical boatstern drag effect at transonic and supersonic speeds. Complete elimination of such base drag is a highly sought for objective by those skilled in the art of designing high performance aircraft. Additional lengthening of the fuselage for the purpose of achieving a high fineness ratio is not feasible since increased wetted area drag results therefrom. Wetted area drag is also detrimental to the achievement of efficient transonic and supersonic performance as is trim drag induced by conventional devices for the necessary trimming out the airplane against pitching moment.

SUMMARY OF THE INVENTION

The prime object, therefore, of this invention is to improve aircraft performance and controllability by symmetrically blending and variformly transforming the fuselage from a forward portion of conventional configuration into a wide, flat, airfoil-like afterbody hereinafter referred to as a beaver-tail afterbody with a laterally hinged composite air brake and pitch control device embodied in and forming at least a portion of its trailing edge. Spanwise separation of the buried engines in the afterbody is achieved and the composite air brake and pitch control device, integrally embodied in the trailing edge of the beavertail, achieves a very significant improvement in the efficiency of aircraft's performance by substantially eliminating back-end, postern or wake drag, further a very salient improvement in maneuverability, is also realized.

The above object, and others, are accomplished by an aircraft having any desired conventional forebody configuration which is variformly and symmetrically blended, through the medium of an intervenient transitional piece, into a wide, flat, airfoilshaped afterbody or beaver-tail having an integral composite air brake and pitch control device hinged transversely across the beaver-tail and embodied therein and also forming at least a portion of its trailing edge. The invention is capable of being used in conjunction with several wing configurations to include, but not necessarily limited to, the following: (1) The fixed, transverse span wing type, (2) the fixed delta wing type, (3) the variable, sweep wing type, (4) or with control surfaces that generally comprise the aft empennage assembly or elevons, twin vertical fins, and with strut attached engine nacelles.

The invention is thus characterized as an improved composite aircraft which comprises, in combination, a conventional forebody, a beaver-tail afterbody having zero base drag to aerodynamically enhance aircraft performance, a transitional piece or body component capable of receiving and fixedly accommodating without design change or modification thereof, any conventional type wing, a composite air brake and pitch control device, defining at least a portion of the trailing edge thereof, which is rotatably integral with beaver-tail afterbody and when appropriately cambered 25, FIG. 11, is an effective trimming device and redundant aerodynamic pitch control instrumentality while also providing an optimum longitudinal centerline location for the dual acting aerodynamic air brake which is also incorporated therein. Locating the composite air brake and pitch control device at the extreme aft end of the aircraft requires only minimal trim change and achieves minimal interference and buffeting effects and also provides a design option for incorporating an airfoil aftbody camber to achieve the desired zero-lift pitching moment for minimal trim drag and increased maneuver control power. The invention has a relatively flat, wide undersurface permitting the mounting of external weapons and stores, and further provides a wide body paddle type area for improved aerodynamic pitch damping and for a further rearward center of body lift location, and a unique design for achieving a more nearly ideal cross-section area distribution for improved performance.

BRIEF DESCRIPTION OF THE DRAWINGS

The details of the preferred embodiments of the present invention will be further understood upon reference to the drawings, wherein.

DETAILED DESCRIPTION OF THE INVENTION

Figure 1:
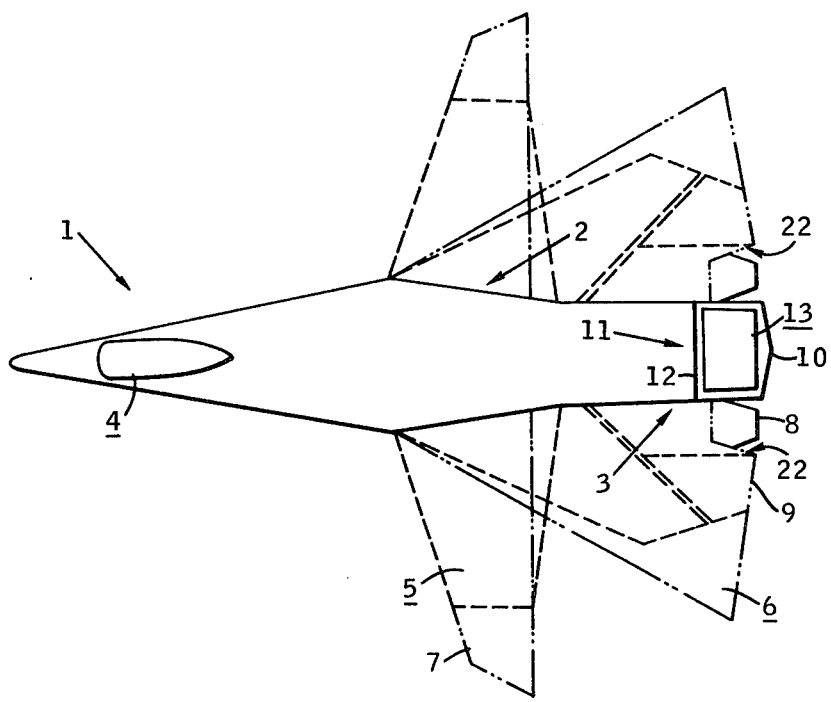
FIG. 1 is a simplified composite plan view of the aircraft winged configurations, effected by respectively superimposing one wing type upon the other, and graphically shows, by a solid line delineation, the total, detachable and separately intact structural fuselage, having a novel, wide afterbody of beaver-tail aspect and, by broken line delineation, the wing and tail components, together with affixed propulsion elements.
Figure 3:
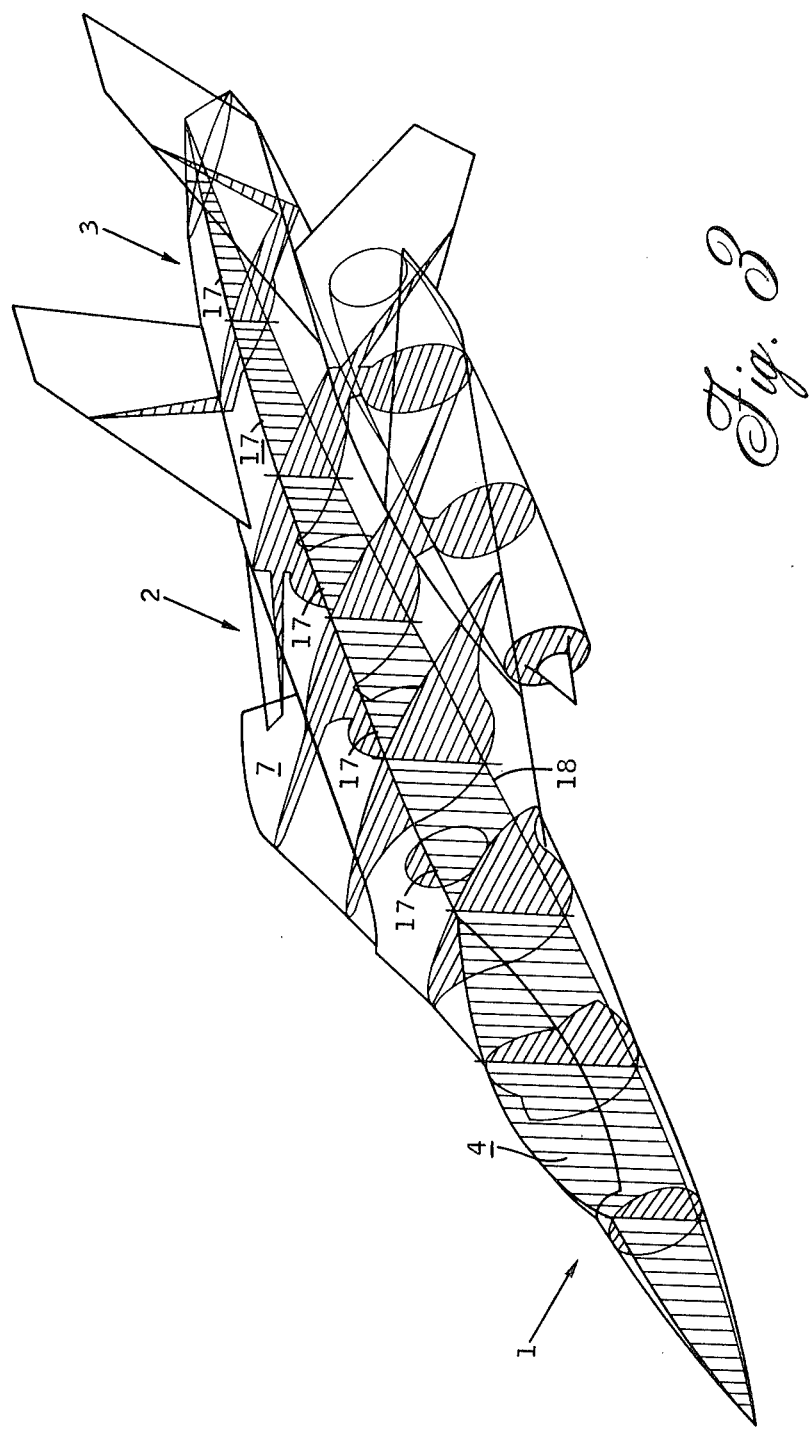
FIG. 3 is an isometric view of an aircraft embodying the concept of the present invention and exemplifies geometric cross-sectional development of transition piece configurations from that of a circular cross-section nose segment into that of a substantially flat, wide, airfoil-like afterbody of beaver-tail aspect and constituting the composite body's trailing edge portion and further illustrates the airfoil-like cross-section of the central transition piece and beaver-tail afterbody.

Referring now to FIG. 1, there is seen a simplified composite plan view of the invention as it would appear with aircraft having forebodies 1 of conventional cross-section and respective medial body transition pieces 2, wherein the cross-sectional configuration of the conventional forebody 1 is aerodynamically faired into the cross-sectional configuration of afterbody 3, which is of substantially airfoil segment configuration 17, FIG. 3, by geometric development of an intervenient transition piece which defines a medial body segment 2, thus variformly and symmetrically blending said forebody 1, into a wide, flat planform or planar afterbody 3; conventional crew compartments 4 being embodied in the fuselage forebodies 1 in the usual manner.

The term "transition piece" is a drafting or geometric phrase-of-the-art which is employed in substantially all college-level textbooks which treat of geometry per se or of the geometry of drafting. Reference is made, for exemplary showing, to the well known, widely employed textbook entitled GRAPHIC SCIENCES (2nd Edition) by Thomas E. French and Charles J. Vierck, McGraw-Hill Book Company, Inc., New York, N.Y.; Library of Congress Card No. 62-20995-22302; with specific reference being made to Paragraph 18–42 and to FIGS. 18.46 through 18.49 thereof.

In its various constructional forms the invention may be selectively embodied separately or in combination with conventional prime lifting surfaces or wings of various types, such as with a fixed span wing 5, a delta wing 6, a swept or variable geometry wing 7 and/or with a single or plurality of propulsion units 8. Further combinations include conventional aft empennage assemblies 22, or elevons in the case of tailless delta wing 6, preferably each having twin vertical fins and strut appended engine nacelles 8, as shown. The combination includes the wide planform afterbody fuselage 3 with the upper and the lower afterbody contour surfaces tapering to define an airfoil trailing edge 10 and having a movably integrated composite air brake 13 and auxiliary elevator or pitch control 11 device angularly deflective about lateral hinge line 12. A salient feature of the present invention is the inherent simplicity of the foregoing arrangement of a wide airfoil section beaver-tail aft end body 3 and an integral, deflective pitch control device 11 which when normally constringed augments pitch control and pitch trim in cooperation with conventional horizontal tail surface 9 for the variable sweep wing embodiment and the conventional fixed wing embodiment; the same pitch effect is made in cooperation with elevons, however, in the tailless delta wing aircraft embodiment 6. In the event the aforementioned conventional horizontal tail 9 or elevon should become inoperative during flight, the composite air brake 13 and pitch control 11 device, significantly enhances aircraft survivability and reliability when employed as a back-up, adjunctive aerodynamic control device. This is accomplished through the use of the pitch control elements of the device 11 to provide adequate pitch control and pitch trim, thus affording a margin of difference between crashing the aircraft and safely landing it.

Figure 2A:
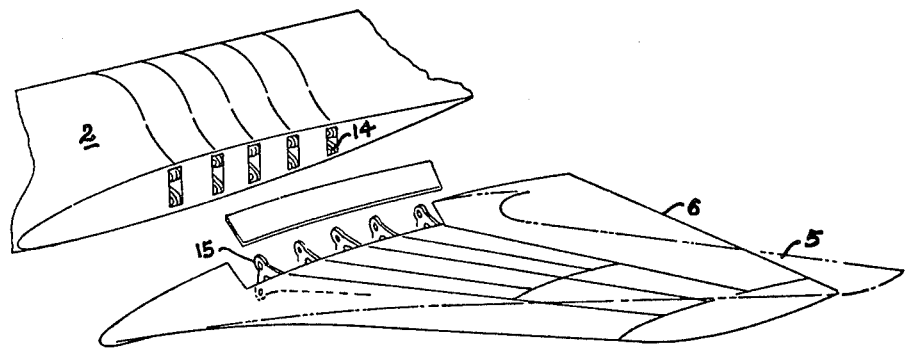
FIG. 2A shows a common fixed fitting means of attachment for wings having various planform geometries.
Figure 2B:
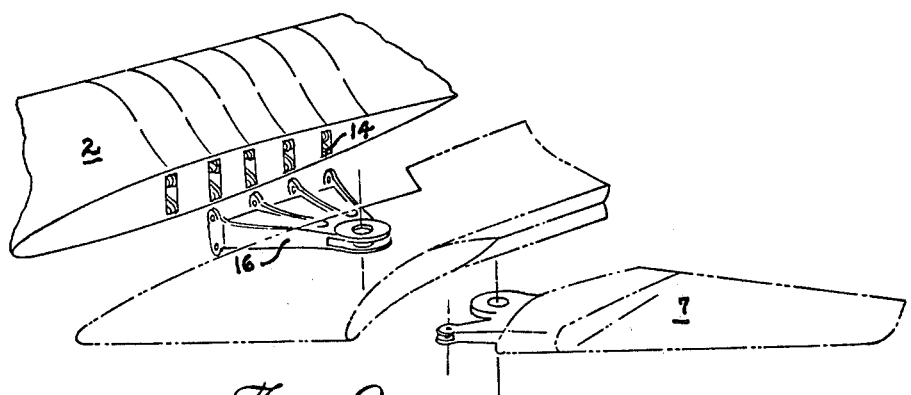
FIG. 2B illustrates means for attaching a variable sweep wing with provision of an adaptor fitting that permits cooperative use of the common fuselage fitting attachment shown in FIG. 2A.

As seen in FIGS. 2A and 2B this invention can be used in conjunction with a variety of prime lifting surface or wing types. FIG. 2A shows the fuselage transition piece 2 and the fuselage bulkhead end fittings 14 to which can be attached a fixed span type wing 5 or delta type wing 6 through the medium of end fittings 15 located on the spars of the wings. The fuselage bulkhead spacing is aligned with the corresponding wing spars which also have fittings 15 which are bolted or otherwise fixedly attached to their corresponding fuselage fittings 14. This type of wing attachment will accommodate all wing types, including any of a given type even though differing in planform geometry. FIG. 2B shows the fuselage transition piece 2 and the fuselage bulkhead end fittings 14 to which can be attached an adaptor fitting element 16 which adapts fuselage body section 2 to a single point of attachment for operably accommodating variable sweep wing 7.

The true airfoil shape of afterbody 3 eliminates back end of base drag and effects significantly improved performance in the range, speed and acceleration of the invented aircraft. The configuration shown in FIG. 1 with podded or semi-podded engines 8 and twin vertical tails 22 allows the integral incorporation into the trailing edge 10 of beaver-tail afterbody 3, a unique, composite air brake 13 and pitch control device 11, pivotal about hinge line 12. The beaver-tail shape of the afterbody 3 itself improves aircraft reliability and survivability by being functionally redundant with the horizontal tail. The composite air brake 13 combination pitch control device 11 when constringed and used for pitch control by angular deflection about hinge line 12 and used in combination with the horizontal tail 9 effects significantly improved pitch response and maneuverability. Use of the beaver-tail's pitch control element 11 in conbination with the horizontal tail 9 or with elevons maintains a low pitch trim deflection so that trim drag is reduced and resultant in improved performance. Aircraft instantaneous maneuver "g" capability is significantly improved by the greatly increased tail or elevon deflection available above the trim deflection. The beaver-tail pitch control element 11 of the device assumes primary responsibility for pitch control and pitch trim thus freeing the horizontal tail 9 or elevons to provide additional differential roll control.

Figure 11:
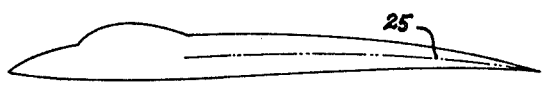
FIG. 11 is similar to FIG. 10 with the exception that it is exemplary of the trailing edge's cross-sectional camber when the object aircraft composite is intended to be operated primarily in its supersonic regime.

The wide airfoil afterbody 3 also lends itself readily to incorporation, when desired, of controlled body camber indicated by 25 of FIG. 11. The body camber 25, when employed, provides the desired level of positive aerodynamic zero lift pitching moment for minimum trim drag. Excellent reserve maneuver control power becomes available as a result of such capability.

Figure 9:
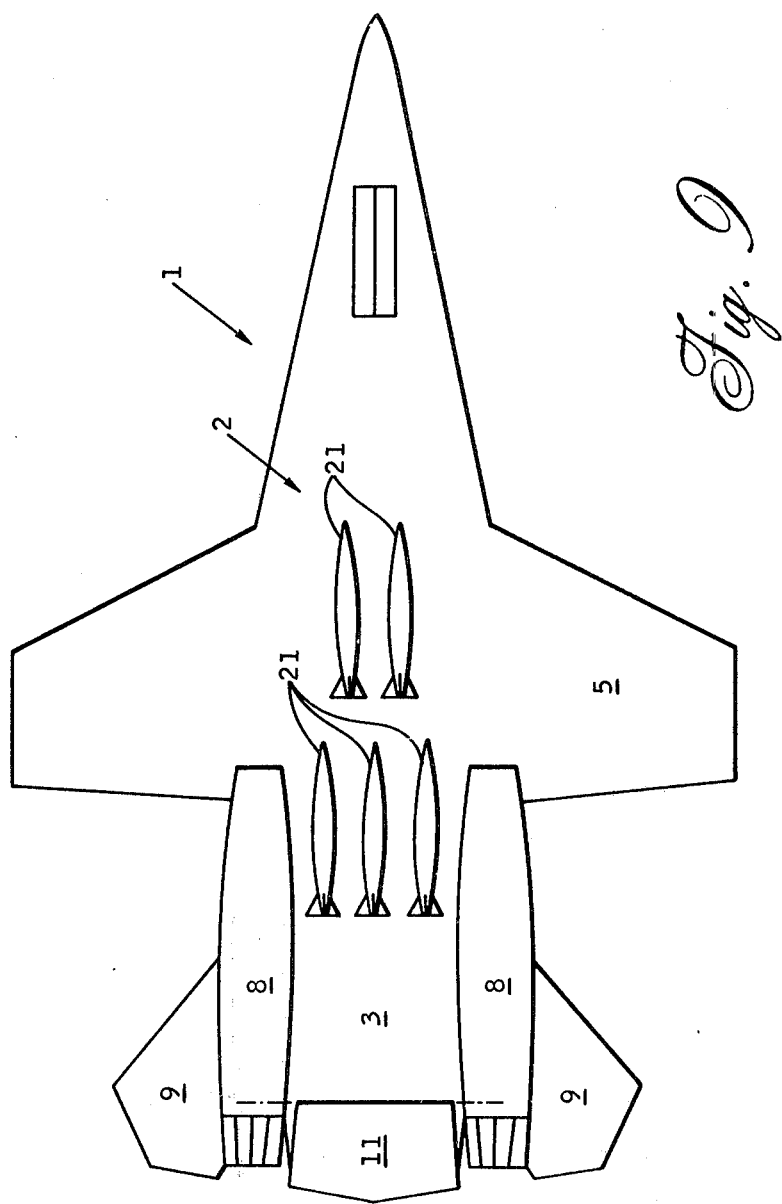
FIG. 9 is a bottom plan view of an aircraft embodying the invention and particularly illustrates its attributes in respect to the mounting of internal weapons and/or stores thereon.

The relatively flat, wide undersurface of the afterbody 3 shown in FIG. 9 serves as an ideal attachment surface for optimum mounting of external weapons and/or stores 21 near the center line of the longitudinal axis in lieu of conventional mounting spanwise on the wing, thereby considerably enhancing both the static and dynamic stability of the aircraft. Mounting of stores 21 near the aircrafts's longitudinal axis of symmetry results in reduced roll inertia thereby effecting improved roll control response. Resultant separation and launch reactions from such weapons and/or stores from the afterbody is much less malefic than that resultant from wing mounted stores because more favorable flow fields exist at the afterbody location than at the wing spanwise mounting positions. The afterbody mounting also permits the weapons and/or stores to be semisubmerged with attendant reduced drag and improved performance of the aircraft.

The wide, flat afterbody 3 forms paddle-like planar surfaces which serve to provide much greater inherent aerodynamic pitch damping when compared to that resultant from a conventional, conical, relatively narrow fuselage afterbody. Similarly, such a wide, flat afterbody provides a more favorable aft location of the center of pressure for the component of lift contributed by the body. This more favorable location of the aft center of pressure permits utilization for fuel of aft volume space provided by the wide afterbody 3.

The wide afterbody 3 also permits tailoring of the area distribution in such manner as to most efficiently obtain favorable minimal maximum cross-sectional area and favorable variation in the aft slopes of area distribution in order to realize improved performance through improved drag characteristics.

Figure 4:
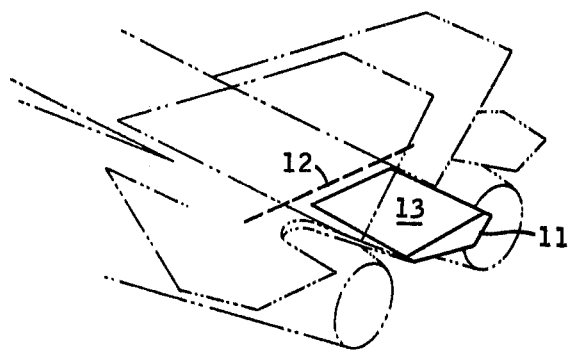
FIG. 4 is a rear perspective view of the empennage affixed afterbody and particularly illustrates the trailing edge of the beaver-tail and afterbody of the composite air brake and pitch control device embodied therein in a neutral and fully constringed mode.
Figure 5:
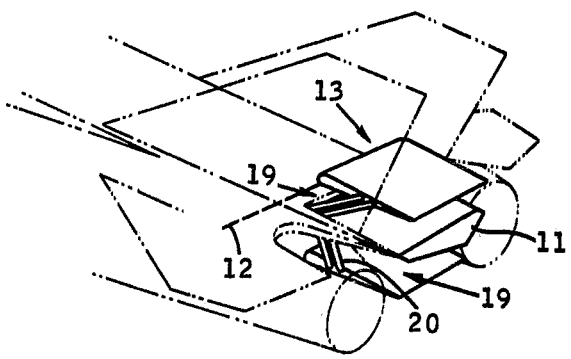
FIG. 5 is similar to FIG. 4 but also illustrates the mechanical details of the trailing edge of the beaver-tail with its composite dual element air brake component horizontally displaced in the first phase of its dual phase operation and also exemplifies the dual duct-like airstream passages resultant therefrom.
Figure 6:
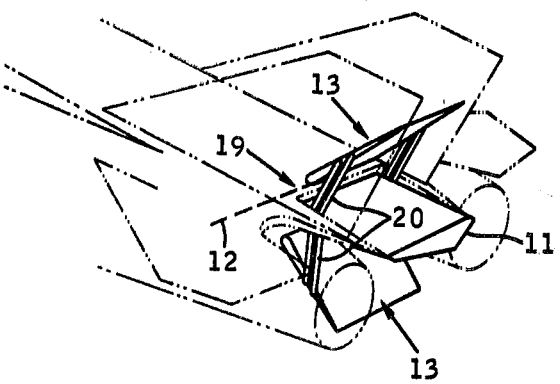
FIG. 6 is similar to FIG. 5, but more perspicuous than the latter in that it shows the dual element air brake components or panels angularly disposed above and below the beaver-tail surface in a full braking mode of operation.

Referring now to FIGS. 4, 5 and 6 composite air brake 13 and pitch control device 11 are illustrated in their dual phase operation. FIG. 4 illustrates the neutral position of the device and its location on the trailing edge of the beaver-tail afterbody 3. In such neutral position the composite device operates to control pitch but does not operate as an air brake. FIG. 5 shows the composite air brake 13 and pitch control 11 device in operation with the air brake 13 in an extended position permitting a continuous air flow 19 between the air brake surfaces 13 and the pitch control surface 11. In this position pitch control can be maintained by angular rotation of the pitch control surface 11 about hinge line 12. FIG. 6 shows the composite air brake 13 and pitch or auxiliary elevator control 11 device in operation and performing its dual function. The air brakes 13 have been applied through the use of the mechanical linkage 20 and are in an angular position in relation to the afterbody 3. The pitch control function is simultaneously achieved by deflecting the pitch control surface 11 slightly while a continuous air flow 19 is achieved by the separation of the air brake surfaces 13 from the pitch control surface 11. Since the composite air brake 13 and pitch control device 11 is located at the extreme aft end of the aircraft composite, exposure of the airframe to the turbulent air flow downstream of the device is minimal. By allowing the continuous air flow 19 when the air brakes 13 are in operation, the air turbulence is greatly reduced and structural vibration is greatly minimized during the operation of the air brakes 13.

Figure 7:
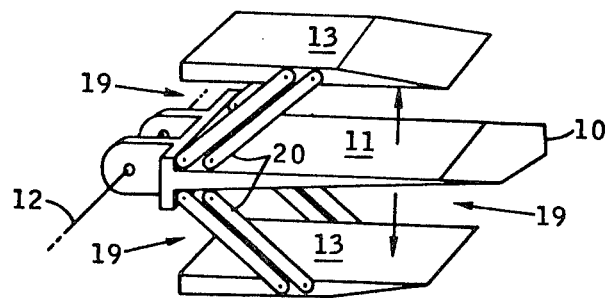
FIG. 7 is a detailed perspective view of the preferred mechanical linkage system employed in the invention for vertically displacing and then angularly disposing the air brake elements or panels shown in FIGS. 4, 5 and 6, as viewed during the first phase or vertically displaced position during its dual phase operation.
Figure 8:
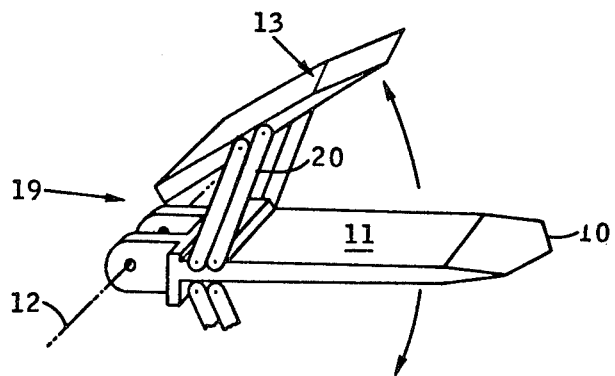
FIG. 8 is a partial view similar to FIG. 7 but shows the upper segment brake element linkage when such element is angularly disposed during phase two of the braking operation.

The composite air brake 13 and pitch control 11 device is further shown in detail in FIGS. 7 and 8. In FIG. 7 a detailed perspective view of the preferred four bar mechanical linkage system 20 employed for vertically displacing and then angularly disposing the air brake elements 13 is shown during the first phase or vertically displaced position during its dual phase operation. The separation of the air brake elements or panels 13 from the pitch control element 11 allows a continuous air flow 19 to reduce air turbulence and enhance aircraft maneuverability. FIG. 8 is a partial view similar to FIG. 7 but shows the upper segment's air brake element 13 linkage 20 when such element is angularly disposed during phase two of the braking operation. Even at this stage in the operation of the composite air brake 13 and pitch control 11 device, a continuous air flow 19 is maintained which allows the use of the pitch control element 11 to control pitch even while the air brakes 13 are in operation.

Figure 10:
FIG. 10 is an enlarged profile configuration of the present beaver-tail afterbody's trailing edge and is exemplary of its cross-sectional camber when the object aircraft composite is intended to be primarily operated in its subsonic regime.

Pitch control is accomplished by rotating the entire assembly about hinge line 12, with air brake surfaces 13 closed against surface 11 or in any other position such as those shown in FIGS. 7 and 8. With the control assembly closed, the pitch control may effectively reshape the after fuselage as schematically shown in FIGS. 10 and 11. Any suitable means may be used for rotating the assembly about hinge line 12 under pilot control. Any conventional hinge having structural integrity, such as that shown in U.S. Pat. No. 2,445,399, may be used.

Any suitable conventional mechanical linkage, such as that shown in U.S. Pat. No. 2,511,446, may connect the pitch control and air brake assembly to a cockpit control. Alternatively, a conventional electrical motor may be directly connected to the control assembly, with a control switch at the cockpit. Similarly, any conventional control linkage or system, such as those shown in U.S. Pat. No. 3,486,720; 3,243,148 or 2,723,091, may be used to move air brake elements 13 among the various positions illustrated.

Preferably, wing attachments are effected by the employment of multifurcated clevis fittings 14, FIG. 2A, having sufficient structural integrity to provide the capability for safely transferring all aerodynamically induced loads from the prime structure of the wing. Such transfer is from spars, as shown, or as the case may be, from a structural box section of the wing, into the prime structure of the body to which it is attached, for example, to longerons, bulkheads as shown, or beltframes; such multifurcated fittings being rigidly interlocked by means of a conventional pinned-clevis nexus into corresponding multifurcated adaptor fittings of similar structural integrity, which are affixed to and carried by the root section of the object wing.

It will be appreciated that typically in an aircraft fuselage the forebody component extends from the aircraft nose aft to about the area of attachment of the forward portion of the wing structure to the fuselage; the intervenient body component extending therefrom aft to about the area of attachment of the rear portion of the wing to the fuselage; and the afterbody component extending therefrom aft to the rearmost edge or tip of the fuselage. It also will be understood herein that transverse or longitudinal camber refers to curvature in an amount represented by the deviation between the mean line between upper and lower surfaces and a chord connecting the dimensional extremes, e.g., longitudinally or transversely of the fuselage such camber to be seen in FIG. 3.

Other ramifications, variations and applications of the present invention will become apparent to those skilled in the art. These are intended to be included within the scope of this invention as defined in the following claims.

We claim:

1. A combination airbrake and pitch control device having both airbrakes and pitch and trim control surfaces for forming the trailing edge portion of an aircraft fuselage afterbody section and useable selectively to provide auxiliary pitch and trim control with minimal fuselage wake drag and buffeting or for airbraking or both which comprises:

an auxiliary elevator means having external control surfaces thereon and adapted to be pivotably attached to an airfoil-configured afterbody section of an aircraft fuselage so as to form a hinged trailing edge portion thereof aerodynamically and structurally continuous with said airfoil-configured afterbody section to provide auxiliary pitch and trim control for the aircraft;

a pair of upper and lower airbrake panels adapted to fit flat-like against the external control surfaces of said elevator means in close covering relation thereto when in retracted position and to be moved away from the elevator means control surfaces during deployment to airbraking position, outer directed surfaces of said airbrake panels when fully retracted forming at least a portion of the upper and lower pitch and trim control surfaces for said pitch control device in continuation of the airfoil-configured fuselage afterbody at the trailing edge portion thereof;

linkage means operatively connected with said airbrake panels for moving the panels parallel to said external control surfaces between positions substantially against said surfaces and positions off of said surfaces to create airflow passages between the panels and the elevator means; and said elevator means and airbrake panels operatively connected for pivotal movement together as a unit to provide effective auxiliary pitch control for an aircraft when the airbrake panels are against said control surfaces and when the panels are moved off of the control surfaces into the airstream at the trailing edge portion of said fuselage afterbody.

2. The combination airbrake and pitch control device of claim 1 in which means are provided to angularly deflect said panels out of planar relation to said elevator means with respect to the fore and aft direction thereof to provide for airbraking of an aircraft in flight.

* * * * *